United States Patent [19]

Hinishi et al.

[11] Patent Number: 4,971,854

[45] Date of Patent: Nov. 20, 1990

[54] TRANSFER SHEET AND METHOD FOR PREPARATION OF THERMOSETTING RESIN DECORATIVE MATERIAL

[75] Inventors: Eiji Hinishi, Kasukabe; Kazuhiko Ohta, Matsudo, both of Japan

[73] Assignee: Toppan Printing Co., Ltd., Japan

[21] Appl. No.: 305,928

[22] Filed: Feb. 2, 1989

[30] Foreign Application Priority Data

Feb. 3, 1988 [JP] Japan .................................. 63-23320
Sep. 6, 1988 [JP] Japan .................................. 63-222855

[51] Int. Cl.[5] .................................................. B32B 3/00

[52] U.S. Cl. .................................... 428/195; 428/212; 428/409; 428/480; 428/913; 428/914; 503/227; 156/232; 156/233

[58] Field of Search ............... 428/195, 212, 409, 480, 428/913, 914; 503/227; 156/232, 233

[56] References Cited

U.S. PATENT DOCUMENTS

| | | | |
|---|---|---|---|
| 3,814,647 | 6/1974 | Scher et al. . | |
| 4,310,370 | 1/1982 | Arai et al. | 428/195 |
| 4,820,686 | 4/1989 | Ito et al. | 428/195 |
| 4,839,337 | 6/1989 | Imai et al. | 428/195 |

FOREIGN PATENT DOCUMENTS

| | | |
|---|---|---|
| 0006848 | 1/1980 | European Pat. Off. . |
| 0210620 | 2/1987 | European Pat. Off. . |
| 0245514 | 11/1987 | European Pat. Off. . |

*Primary Examiner*—Patrick Ryan
*Attorney, Agent, or Firm*—Ostrolenk, Faber, Gerb & Soffen

[57] ABSTRACT

A transfer sheet is here disclosed which is prepared by forming a highly glossy pattern layer of an ink containing a curable resin and silicon resin on the matte surface of a base sheet which is excellent in release characteristics to the thermosetting resin. In addition, a method for the preparation of a thermosetting resin decorative material is also disclosed which comprises the steps of superposing the above-mentioned transfer sheet on a resin-impregnated paper so that the pattern layer on the transfer sheet may be brought into contact with the resin-impregnated paper; then heating and pressing the resulting laminate; and after the curing of the resin in the resin-impregnated paper, releasing the transfer sheet therefrom.

15 Claims, 1 Drawing Sheet

TRANSFER SHEET AND METHOD FOR PREPARATION OF THERMOSETTING RESIN DECORATIVE MATERIAL

BACKGROUND OF THE INVENTION (1) Field of the Invention

Thermosetting resin decorative plates such as melamine resin decorative plates and diallyl phthalate resin decorative plates are widely used for furniture, desks, tables and interiors in houses and buildings.

The present invention relates to a method for the preparation of a thermosetting resin decorative material which has a pattern with varied gloss thereon and which is capable of heightening the surface design effect of thermosetting resin decorative plates mentioned above, and the present invention also relates to a transfer sheet which is used in the above-mentioned method.

(2) Description of the Prior Art

As thermosetting resin decorative plates having patterns with varied gloss thereon, there are known decorative plates having woodgrain patterns where recesses are provided as conduits, and embossed decorative plates having geometrical patters.

Examples of the method for the preparation of the thermosetting resin decorative plates having patterns with varied gloss thereon include (1) a method which comprises superposing a mirror plate having a rough portion formed by etching or the like upon a resin-impregnated paper, then pressing the resulting laminate at an elevated temperature, and after the resin in the resin-impregnated paper has been set, removing the mirror plate therefrom; (2) a method in which the mirror plate used in the above-mentioned method (1) is replaced with a resin plate having the rough portion; (3) a method in which the mirror plate used in the above-mentioned method (1) is replaced with an embossed film which has been formed by embossing a thermoplastic resin film by the use of an engraved roller; and (4) a method which comprises printing a pattern paper with an ink or a foamed ink for inhibiting the curing of a resin, then allowing the resin to penetrate the pattern paper, and thermally pressing the resulting resin-impregnated paper by the use of a heated mirror plate so as to weaken the ink-printed portions alone of the resin.

However, in the case that such a mirror plate or resin plate is used, it is necessary to previously prepare many plates having various patterns. In consequence, the manufacturing cost of the mirror plates and resin plates is burdensome, and a time of exchanging a plate having one pattern for another one having a different pattern is necessary during manufacturing. For these reasons, the above-mentioned methods are scarcely suitable for the manufacture of various kinds of products. In addition, the resin plate has no release characteristics to the resin (thermosetting resin) in the resin-impregnated paper, and thus it is necessary to interpose a release sheet or a metallic foil having release characteristics between the resin plate and the resin-impregnated paper, with the result that the gloss based on fine rough patterns cannot be reproduced, though coarse rough patterns are reproducible.

In the above-mentioned method of making use of the embossed film, the embossed pattern on the film is liable to vanish owing to heat and pressure when pressed, so that the film comes to flatten, because the embossed film is thermoplastic. Therefore, also in this method, the reproduction of the gloss based on the rough pattern is insufficient.

In the method of employing the ink or the foamed ink for inhibiting the curing of the resin, it is hard to control shapes of portions which are different in glossy state, i.e., glossy and unglossy portions. In addition, the weakened portions of the resin are physically poor. In this method, moreover, the resin in the weakened portions adheres to the mirror plate when pressed, and thus the adhered resin must be removed therefrom each time manufacturing is made, or alternatively a release sheet is interposed between the mirror plate and the resin-impregnated paper so as to prevent the resin in the weakened portions from adhering to the mirror plate.

On the contrary, Japanese Patent Laid-open Publication No. 21210/1972 discloses a method (5) for reproducing a glossy state of a base sheet on a support which comprises first printing an ink on a film having a cotrolled glossy state to form a base sheet partially having glossy portions, then forming a transfer layer on the base sheet to obtain a transfer sheet, allowing the latter to adhere to the support, and removing the base sheet alone therefrom.

However, as described in examples of this Japanese publication, a synthetic rubber or a thermoplastic resin is stuck on the surface of the support in the case that the transfer layer contactually formed on the base sheet is composed of the synthetic rubber or the thermoplastic resin, though the base sheet can be smoothly released from the transfer layer. As a result, the support on which the synthetic rubber or the thermoplastic resin is stuck is remarkably poor in physical properties such as hardness and scuffing resistance. In addition, when the transfer layer is composed of the thermoplastic resin, the ink cannot be released successfully from the transfer layer, so that the ink tends to be left on the support.

Furthermore, also in the case that the base sheet alone used in the method (5) is superposed upon a resin-impregnated paper and the resulting laminate is then heated and pressed, the ink is hardly released from the resin-impregnated paper, so that the ink remains on the resin-impregnated paper.

Therefore, an object of the present invention is to provide a transfer sheet for transferring a glossy state in which glossy and unglossy portions can be smoothly released from a resin-impregnated paper, and a method for the preparation of a decorative material having locally different glossy states with high production efficiency and with high accuracy, the method being additionally suitable for the manufacture of many kinds of products.

SUMMARY OF THE INVENTION

For the sake of the achievement of the above-mentioned object, the present invention provides a transfer sheet prepared by forming a highly glossy pattern layer of an ink containing a curable resin and silicone resin on the surface of a base sheet which is excellent in release characteristics to a thermosetting resin and which has a matte surface.

Furthermore, the present invention provides a method for the preparation of a thermosetting resin decorative material which comprises the steps of superposing the above-mentioned transfer sheet upon a resin-impregnated paper so that the pattern layer on the transfer sheet may be brought into contact with the resin-impregnated paper, then heating and pressing the resulting laminate, and after the curing of the resin in the resin-impregnated paper, releasing the transfer sheet therefrom.

DESCRIPTION OF THE PREFERRED EMBODIMENTS

Now, the present invention will be described in detail with reference to accompanying drawings.

Figure 1:
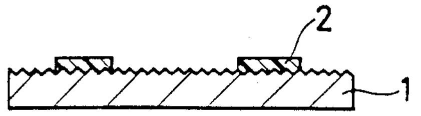
FIG. 1 is a sectional view of a transfer sheet.

FIG. 1 is a sectional view of a transfer sheet.

That is, this transfer sheet is composed of a base sheet 1 and a pattern layer 2 thereon, and the function of the transfer sheet is to transfer the surface state on the transfer sheet alone, no ink constituting the pattern layer 2 being transferred. The surface state on the transfer sheet is composed of the relatively glossy pattern layer 2 and the unglossy surface portion of the base sheet on which the pattern layer 2 is not present.

The base sheet 1 is required to be excellent in release characteristics to a thermosetting resin contained in a resin-impregnated paper which will be referred to hereinafter. In other words, the base sheet 1 should be removed successfully from the resin-impregnated paper substantially without leaving the base sheet 1 on the resin-impregnated paper, after the base sheet 1 has been superposed upon the uncured resin-impregnated paper and the resulting laminate has been then heated and pressed so as to cure the resin, as described hereinafter.

In addition, the base sheet 1 is also required to be in a matte state owing to the fine rough surface thereof, since this matte surface state will be transferred to the surface of the resin-impregnated paper. The optimum depth of recesses constituting the rough surface is in the range of 1 to 10 μm. When the depth of the recesses is less than 1 μm, the uniform matte appearance can hardly be obtained; when it is more than 10 μm, the recesses are scarcely filled with the pattern layer 2 by printing to obtain the smooth glossy surface. However, when the depth of the recesses is in the range of 1 to 10 μm as indicated above, the uniform matte appearance comes out, and the recesses are filled with the pattern layer 2 by printing, so that the smooth surface can be obtained.

As the material of the base sheet 1, a polyester film and polypropylene film can be employed, but polyester film is preferable in that it has so high heat resistance as to withstand heating and pressing which will be described hereinafter.

For the purpose of forming the recesses having a depth of 1 to 10 μm on the surface of the base sheet 1, there can be utilized a method of forming a film from a mixture of a resin and an extender pigment such as silica (kneaded film), a method of coating a film with an ink containing the extender pigment (chemical matte film), and a method of sandblasting a film (sandblasted film). However, when the base film is the polyester film, the sandblasted film should be used from the viewpoint of release characteristics to the thermosetting resin.

The pattern layer 2 may be formed by printing an ink containing a curable resin and silicone resin on the base sheet 1. When the thermosetting resin is replaced with a thermoplastic resin, the adhesive force between the pattern layer 2 and the sandblasted film is undesirable. Furthermore, when the curable resin alone is used without silicone resin, the pattern layer 2 adheres to the resin-impregnated paper when heated and pressed, so that it is hard to release the pattern layer 2 from the resin-impregnated paper. That is, in order to release the pattern layer 2 from the resin-impregnated paper successfully, it is necessary to use the ink containing not only the curable resin but also silicone resin. For this reason, the desirable ink used in the present invention contains the curable resin and silicone resin, the amount of silicone resin being in the range of 0.3 to 5% by weight with respect to the curable resin.

Examples of the curable resin which are usable in the present invention include aminoalkyd series, polyester series, epoxy series and urethane series thermosetting resins as well as ultraviolet-curable resins.

In the present invention, there should be used such an ink as will provide a highly glossy ink film surface after drying and curing. The ink should provide the pattern layer 2 having the higher gloss than on the surface of the base sheet 1, and the desirable ink is such as to form a smooth film which regularly reflects light as much as possible. Generally, in the ink containing the curable resin as a binder, a solvent is present in a small amount and a solid in a large amount. Such an ink is preferable, because the surface of the ink film is scarcely roughed by the vaporization of the solvent during drying.

The ink can be printed in accordance with a well-known printing technique such as a gravure printing method or a silk screen printing method. The printing of the ink is carried out so that the printed ink may depict a certain pattern to form the pattern layer 2. The thus formed highly glossy pattern layer 2 comprising the ink will be transferred, to the resin-impregnated paper, together with the fine rough state on the base sheet where the pattern layer 2 is not present.

Preferably, the pattern layer 2 is printed in a thickness of 0.5 μm or more so that the recesses on the surface of the base sheet 1 may be filled with the pattern layer 2 to obtain the smooth surface.

After the printing, the curable resin present in the ink is cured by a conventional technique in order to obtain the transfer sheet.

The thus obtained transfer sheet is superposed upon the resin-impregnated paper and is then heated and pressed. After the resin in the resin-impregnated paper has cured, the transfer sheet is released therefrom.

The resin-impregnated paper may be prepared by impregnating a paper sheet of natural pulp or synthetic pulp or a nonwoven fabric with a thermosetting resin, and then drying the paper sheet. This resin-impregnated paper will constitute the surface of the decorative plate which is the final product. One example of the synthetic pulp is rayon pulp, and examples of the usable thermosetting resin are melamine resin and diallyl phthalate resin.

Furthermore, as the resin-impregnated paper, an overlay paper sheet can be used which may be prepared by impregnating the nonwoven fabric of rayon pulp having a basis weight of 25 to 45 g/m$^2$ with melamine resin in a ratio of 40 to 100% by weight, and then drying the impregnated fabric. In addition, another paper is also usable which may be prepared by impregnating a titanium paper having a basis weight of 55 to 160 g/m$^2$ with melamine resin in a ratio 40 to 100% by weight. Needless to say, laminates of these paper sheets mentioned above are also usable in the present invention, and in addition, acceptable also are laminates prepared by superposing these paper sheets upon supports such as a phenolic resin-impregnated paper, a veneer plywood and a particle board.

The transfer sheet is superposed upon the resin-impregnated paper so that the pattern layer 2 on the transfer sheet may be brought into contact directly with the resin-impregnated paper. This contact of the pattern layer 2 with the resin-impregnated paper means that the pattern layer 2 on the transfer sheet and the resin-impregnated paper face each other, that nothing is interposed between the pattern layer 2 and the resin-impregnated paper, and that the pattern layer 2 is not apart from the resin-impregnated paper. According to such a constitution, the gloss on the pattern layer 2 and the matte surface on the base sheet 1 can be reproduced on the resin-impregnated paper with high accuracy.

Afterward, heating and pressing are carried out, so that the gloss on the pattern layer 2 and the fine rough state on the base sheet are transferred to the surface of the resin-impregnated paper and the resin contained in the resin-impregnated paper is cured. The heating and pressing can be achieved by the use of a heating disk or a heating roll, and heating and pressing conditions depend upon the resin contained in the resin-impregnated paper. When melamine resin is used, the maximum temperature and the pressure to be applied are in the range of 140° to 150° C. and in the range of 80 to 100 kg/cm$^2$, respectively, and the time of the pressing operation is in the range of 15 to 30 minutes. In this specification, the heating and pressing operation in the present invention means that the laminate of the transfer sheet and the resin-impregnated paper is heated and pressed, whereby the gloss on the pattern layer 2 and the fine rough state on the base sheet 1 are transferred to the surface of the resin-impregnated paper.

The resin contained in the resin-impregnated paper upon which the transfer sheet is superposed does not have to cure perfectly, and such a curing degree as to keep up the rough state transferred on the surface of the resin-impregnated paper is enough. After the resin in the resin-impregnated paper has cured to such a degree, the transfer sheet is then released therefrom. The transfer sheet need not be released immediately, and for example, it may be released therefrom after a treatment necessary as a building material has been given thereto. In this case, the transfer sheet also has the additional function of protecting the surface of the resin-impregnated paper during the treatment.

Figure 2:
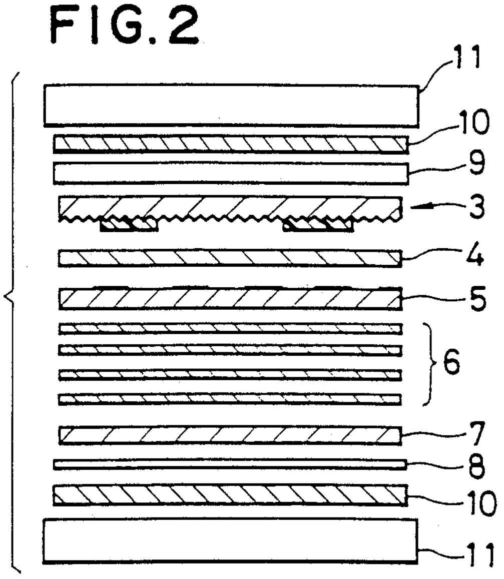
FIG. 2 is a sectional view of the laminate structure of a melamine resin decorative plate in heating and pressing the laminate.

The heating and pressing operation can be carried out in the course of the manufacturing process of usual curable resin decorative plates. FIG. 2 is a sectional view illustrating the manufacturing process of a melamine decorative plate which is typical one of thermosetting resin decorative plates.

That is, in FIG. 2, the following sheets are laminated in turn between upper and lower heating platens 11, 11. Reference numeral 10 is a heat-resistant cushion sheet. Numeral 9 is a mirror plate, but the lower side of the mirror plate 9 is not directly brought into contact with melamine resin. That is, the base sheet 1 of the transfer sheet 3 is interposed between the mirror plate 9 and the melamine resin-impregnated paper, and thus, the mirror plate 9 does not have any influence of gloss and the like directly on the surface of the melamine decorative plate. Therefore, the mirror plate 9 need not be sufficiently polished. Numeral 4 is an overlay paper, and one example of the overlay paper 4 is a transparent resin-impregnated paper prepared by impregnating a rayon pulp sheet or a nonwoven fabric having a basis weight of 25 to 45 g/m$^2$ with melamine resin in a ratio of 40 to 100%, and then drying the same. This overlay paper 4 may be omitted in a certain case. Reference numeral 5 is a melamine resin-impregnated paper which may be prepared by printing a pattern on a titanium paper having a basis weight of 55 to 160 g/m$^2$ in some cases, and then impregnating the paper with melamine resin in a ratio of 40 to 100%, followed by drying. The melamine resin-impregnated paper is disposed so that the pattern layer thereon may lie on the upper side.

In the thermosetting resin decorative plate having a pattern with varied gloss regarding the present invention, the design effect can be exerted sufficiently even if no pattern is printed on the titanium paper. However, when the print of the pattern is made on the titanium paper, the high design effect can be synergistically exhibited, though the pattern on the titanium paper does not tune because of the varied gloss. Numeral 6 represents each of core papers, which may be prepared by impregnating a paper having a basis weight of 140 to 180 g/m$^2$ with phenolic resin in a ratio of 30 to 60%, and then drying the same. These core papers have the first role of retaining the dimensional stability of the melamine resin decorative plate and the second role of determining the thickness of the decorative board. When used, four or five sheets of the core papers are laminated. Numeral 7 is a backer paper, which may be prepared by impregnating a titanium paper having a basis weight of 55 to 160 g/m$^2$ with melamine resin in a ratio of 40 to 100%. The back paper plays the first role of balancing between the titanium paper 5 constituting the surface of the decorative plate and the overlay paper 4, and the second role of preventing the decorative plate from warping. Numeral 8 is a release sheet which prevents the melamine resin from adhering to a heat-resistant cushion 10 disposed on the lower side thereof.

Figure 3:
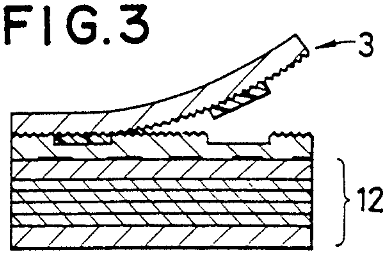
FIG. 3 is a sectional view illustrating the melamine resin decorative plate and the transfer sheet which is now being released.

The thus constituted laminate in FIG. 2 is then pressed at a maximum temperature of 140° to 150° C. under a pressure of 80 to 100 kg/cm$^2$ for a period of 15 to 30 minutes, and it is then cooled with cold water while the pressure is still maintained, in order to thereby cure the resins in the sheets 4 to 7. Afterward, the thus integrally cured decorative plate is taken out from the machine used, and the transfer sheet is released therefrom, which state is shown in FIG. 3, where 12 designates the product decorative plate produced.

TEST EXAMPLE 1

A polyester film having a thickness of 25 μm was subjected on either surface thereof to a sandblast treatment so that the depth of recesses on the film surface might be in the range of 3 to 7 μm, in order to form a base sheet 1, and on the latter, a pattern layer 2 was then printed by the use of a stripe-like pattern plate having a depth of 38 μm on a gravure printing machine to obtain a transfer sheet 3.

A pattern layer 2 may be prepared as follows: First, 0.5 part of silicone resin and 9 parts of paratoluene sulfonate as a curing catalyst were added to 100 parts of alkyd melamine resin, and a solvent was further added thereto. The resulting mixture was used for printing on the base sheet 1 and was then baked at 170° C. for 10 seconds in order to cure it, so that the pattern layer 2, the surface of which was highly glossy and smooth, was formed on the base sheet 1, recesses on the latter being partially filled with the pattern layer 2. Next, an overlay paper was prepared by impregnating a gray titanium paper having a basis weight of 80 $g/m^2$ with melamine resin, a phenol core paper was prepared by impregnating a paper with phenolic resin, and a backer paper was prepared by impregnating a titanium paper with melamine resin.

Afterward, between the upper and lower heating platens 11, 11, there were laminated, in the following order from above, the upper cushion 10, the mirror plate 9, the transfer sheet 3 prepared above, the printed pattern thereof being on the lower side, the overlay paper 4, the pattern paper 5, the printed pattern thereof being on the upper side, the phenol core paper 6, the backer paper 7, the release sheet 8 and the lower cushion 10, as shown in FIG. 2. They were then pressed at a maximum temperature of 145° C. under a pressure of 80 $kg/cm^2$ for a period of 25 minutes, and afterward, they were cooled with cold water for 20 minutes while still pressed, so that the desired melamine resin decorative plate was obtained in which the melamine resin and the phenolic resin were integrally associated.

After the pressing operation, the transfer sheet 3 was released therefrom, thereby obtaining a melamine resin decorative plate having a highly glossy stripe pattern and matte portions on the surface thereof.

On the base sheet 1 of the released transfer sheet 3, the pattern layer 2 still remained as it was before the pressing. Physical properties of the thus obtained decorative plate were identical with those of a usual conventional melamine decorative plate.

COMPARATIVE EXAMPLE 1

A polyester film having a thickness of 25 μm was formed with a finely rough surface by a kneading method, and this film having the rough surface was used as a base sheet. The same printing procedure as in Test Example 1 was carried out to obtain a transfer sheet, and the latter was then used to prepare a melamine decorative plate. When released from the decorative plate, the transfer sheet was not released easily therefrom, since the adhesion between the base sheet of the transfer sheet and the melamine resin was very intensive. In this case, the pattern layer on the transfer sheet did not adhere to the melamine resin.

COMPARATIVE EXAMPLE 2

A polyester film having a thickness of 25 μm was formed with a finely rough surface by a chemical matte method, and this film having the rough surface was used as a base sheet. The same printing procedure as in Test Example 1 was carried out to obtain a transfer sheet, and the latter was then used to prepare a melamine decorative plate. When released from the decorative plate, the transfer sheet was not released easily therefrom, since the base sheet on the transfer sheet adhered to the melamine resin, as in Comparative Example 1.

COMPARATIVE EXAMPLE 3

Figure 4:
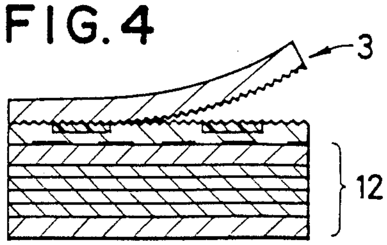
FIG. 4 is a sectional view illustrating the state in which a pattern layer itself is transferred.

A polypropylene film having a thickness of 25 μm was formed with a finely rough surface by a kneading method, and this polypropylene film having the rough surface was used as a base sheet. By the use of the same pattern plate as in Test Example 1, the base sheet was printed with an ink containing 100 parts of chlorinated polyolefin resin and 0.5 part of silicone resin. The film extended when baked at a temperature of 130° C. or more, which meant that it was inferior in heat resistance to a polyester film. The film was baked instead at 110° C. at which extension did not occur, thereby obtaining a transfer sheet. Afterward, following the same procedure as in Test Example 1, a melamine resin decorative plate was prepared. When the transfer sheet was released therefrom, the pattern layer was transferred to the surface of the thermosetting resin decorative plate inconveniently as shown in FIG. 4, so that the pattern layer with varied gloss was not formed. This reason would be that the baking of the silicone resin contained in the ink was insufficient and the pattern layer had no release effect, though the release characteristics of the base sheet itself to the melamine resin were very excellent.

COMPARATIVE EXAMPLE 4

A polyester film having a thickness of 25 μm was formed with a finely rough surface by a sandblast method, and this film having the rough surface was used as a base sheet. By the use of the same pattern plate as in Test Example 1, the base sheet was printed with the same ink and under the same conditions as in Test Example 1 except that no silicone resin was used, thereby obtaining a transfer sheet.

Afterward, following the same procedure as in Test Example 1, a melamine resin decorative plate was prepared. When the transfer sheet was released therefrom, the pattern layer on the transfer sheet was transferred to the surface of the thermosetting resin decorative plate inconveniently as shown in FIG. 4, so that the pattern layer with varied gloss was not formed. This reason would be that the ink had no release characteristics to the melamine resin, though the release characteristics of the base sheet itself to the melamine resin were very excellent.

According to the present invention, various kinds of thermosetting resin decorative materials having partially different glossy states can be obtained with high production efficiency and with high accuracy.

What is claimed is:

1. A transfer sheet prepared by forming a highly glossy pattern layer of an ink containing a curable resin and silicone resin on the matte surface of a polyester or polypropylene base sheet which is excellent in release characteristics to a thermosetting resin and has recesses of 1 to 10 μm in depth on the surface thereof.

2. A transfer sheet according to claim 1 wherein said base sheet is a sandblasted polyester film.

3. A transfer sheet according to claim 1 wherein said silicone resin is contained in an amount of 0.3 to 5% by weight with respect to said curable resin in said ink.

4. A transfer sheet according to claim 1 wherein said pattern layer has a thickness of 0.5 μm or more.

5. A transfer sheet according to claim 2 wherein said pattern layer has a thickness of 0.5 μm or more.

6. A transfer sheet according to claim 5 wherein said silicone resin is contained in an amount of 0.3 to 5% by weight with respect to said curable resin in said ink.

7. A transfer sheet according to claim 2 wherein said silicone resin is contained in an amount of 0.3 to 5% by weight with respect to said curable resin in said ink.

8. A method for the preparation of a thermosetting resin decorative material which comprises the steps of forming a highly glossy pattern layer of an ink containing a curable resin and silicone resin on the matte surface of a polyester or polypropylene base sheet which is excellent in release characteristics to said thermosetting resin and has recesses of 1 to 10 μm in depth on the surface thereof, in order to obtain a transfer sheet; superposing said transfer sheet on a resin-impregnated paper so that said pattern layer on said transfer sheet may be brought into contact with said resin-impregnated paper; then heating and pressing the resulting laminate; and after the curing of the resin in said resin-impregnated paper, releasing said transfer sheet therefrom.

9. A method for the preparation of a thermosetting resin decorative material according to claim 8 wherein said base sheet is a sandblasted polyester film.

10. A method for the preparation of a thermosetting resin decorative material according to claim 8 wherein said silicone resin is contained in an amount of 0.3 to 5% by weight with respect to said curable resin in said ink.

11. A method for the preparation of a thermosetting resin decorative material according to claim 8 wherein said pattern layer has a thickness of 0.5 μm or more.

12. A method for the preparation of a thermosetting resin decorative material according to claim 8 wherein said resin-impregnated paper is a melamine resin-impregnated paper or nonwoven fabric.

13. A method for the preparation of a thermosetting resin decorative material according to claim 12 wherein said base sheet is a sandblasted polyester film.

14. A method for the preparation of a thermosetting resin decorative material according to claim 13 wherein said pattern layer has a thickness of 0.5 μm or more.

15. A method for the preparation of a thermosetting resin decorative material according to claim 14 wherein said silicone resin is contained in an amount of 0.3 to 5% by weight with respect to said curable resin in said ink.

* * * * *